(12) United States Patent
Pai et al.

(10) Patent No.: US 12,107,970 B2
(45) Date of Patent: Oct. 1, 2024

(54) METHOD OF ESTABLISHING A FUTURE 2-WAY AUTHENTICATION BETWEEN A CLIENT APPLICATION AND AN APPLICATION SERVER

(71) Applicant: MOTOROLA SOLUTIONS, INC., Chicago, IL (US)

(72) Inventors: Madhusudan Pai, Frisco, TX (US); Bharatram Setti, Plano, TX (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 309 days.

(21) Appl. No.: 17/197,886

(22) Filed: Mar. 10, 2021

(65) Prior Publication Data

US 2021/0377051 A1  Dec. 2, 2021

Related U.S. Application Data

(60) Provisional application No. 63/029,902, filed on May 26, 2020.

(51) Int. Cl.
*H04L 9/32* (2006.01)
*H04L 9/08* (2006.01)
*H04L 67/01* (2022.01)

(52) U.S. Cl.
CPC .......... *H04L 9/3263* (2013.01); *H04L 9/0825* (2013.01); *H04L 9/3247* (2013.01); *H04L 67/01* (2022.05)

(58) Field of Classification Search
USPC .......................................................... 726/10
See application file for complete search history.

(56) References Cited

U.S. PATENT DOCUMENTS 10,756,908 B1 * 8/2020 Melo ..................... H04L 9/3268
2003/0172291 A1 9/2003 Judge et al.
(Continued)

FOREIGN PATENT DOCUMENTS

CN        1645795 A        7/2005

OTHER PUBLICATIONS

Campbell, B. et al., "OAuth 2.0 Mutual TLS Client Authentication and Certificate Bound Access Tokens", OAuth Working Group Internet-Draft, Intended Status; Standards Track, Jan. 29, 2018, all pages (Year: 2018).*

(Continued)

*Primary Examiner* — Jeffrey C Pwu
*Assistant Examiner* — Nega Woldemariam
(74) *Attorney, Agent, or Firm* — Raguraman Kumaresan (57) ABSTRACT

A process for establishing a future 2-way authentication between a client application and an application server. In operation, an OIDC server receives a request from the client application to establish a secure connection from the client application. The request includes a certificate generated using a public-private key pair associated with the client application or a user, and authentication credentials associated with the client application or the user. The OIDC server establishes that the authentication credentials are valid, and provisions a cryptographic identifier of the certificate associated with the request to a list of trusted certificates. The OIDC server then provides one or more application servers with access to the list of trusted certificates to enable the application servers to authenticate the client application based on verifying that cryptographic identifier of the certificate presented by the client application is provisioned into the list of trusted certificates.

19 Claims, 6 Drawing Sheets

(56) References Cited

U.S. PATENT DOCUMENTS

| | | | |
|---|---|---|---|
| 2016/0087957 A1* | 3/2016 | Shah | H04L 63/205 |
| | | | 726/1 |
| 2020/0162454 A1* | 5/2020 | Jain | H04L 63/0853 |
| 2020/0250328 A1* | 8/2020 | Swenson | G06F 21/6218 |
| 2020/0274720 A1* | 8/2020 | Melo | G06F 16/214 |
| 2020/0274859 A1* | 8/2020 | Melo | H04L 9/0897 |

OTHER PUBLICATIONS

Campbell, B. et al.: :OAuth 2.0 Mutual TLS Client Authentication and Certificate Bound Access Tokens, OAuth Working Group, Internet-Draft, Intended status; Standards Track, Expires: Aug. 2, 2018, Jan. 29, 2018, https://tools.ietf.org/html/draft-ietf-oauth-mtls-17, all pages.

Sathya Bandar: Mutual TLS for OAuth Client Authentication:, https://medium.com/@technospace/mutual-tls-for-pauth-client-authentication-cdd595d4dcac, Feb. 18, 2018, all pages.

Jones, M. et al.: "The OAuth 2.0 Authorization Framework: Bearer Token Usage", https://tools.ietf.org/rfc/rfc6750.txt, Internet Engineering Task Force (IETF), REquest for Comments: 6750, Categaroy: Standards Track, ISSN:2070-1721, Oct. 2012, all pages.

Hardt, D.: "The OAuth 2.0 Authorization Framework", Microsoft, Internet Engineering Task Force (IETF), Request for Comments: 6749, Obsoletes: 5849, Category: Standards Track, ISSN: 2070-1721, https://tools.ietf.org/html/ fc6749, Oct. 2012, all pages.

Campbell, B.: et al.: "OAuth 2.0 Mutual-TLS Client Authentication and Certificate-Bound Access Tokens", draft-ietf-oauth-mtls-17, Aug. 22, 2019, OAuth Working Group, Internet-Draft, Intended status: Standards Track, Expires: Feb. 23, 2020, all pages.

Secure IoT With PKI-Based Identities, https://www.nexusgroup.com/...XARIsACTePWoNp6zu6KsrNP4u_1OchWvmQRhQ8q-SabccYOVg2MY7c9V7MB-k0oaAkvwEALw_wcB, downloaded from internet: Mar. 1, 2021, all pages.

* cited by examiner

METHOD OF ESTABLISHING A FUTURE 2-WAY AUTHENTICATION BETWEEN A CLIENT APPLICATION AND AN APPLICATION SERVER

BACKGROUND

From a security perspective, it is desirable to protect a server infrastructure by only allowing clients with a trusted certificate to connect to the server. This prevents rogue clients from setting up transport layer security (TLS) connections and trying to attack the server.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

Providing a trusted certificate to a device typically requires the deployment of a certificate management function (CMF). This has additional deployment complexity (especially with on-boarding new devices) and significant cost (cost per certificate issued to a device is often in the order of few hundred dollars a year). This may impact the business case for software application revenue (e.g. a client application on the Android/iOS application store may not justify this cost). Hence, there is a need to have a trusted certificate on a client device while avoiding the cost of a CMF provided certificate and also the complexity/unnecessary user interaction associated with on-boarding devices.

Disclosed is an improved process of establishing a future 2-way authentication between a client application and an application server. The present disclosure can be implemented for deployment with/without a CMF. Any Android/iOS/web application provided by an enterprise can advantageously implement the embodiments described in the present disclosure.

One embodiment provides a method of establishing a future 2-way authentication between a client application and an application server. The method comprises receiving, at an OpenID connect (OIDC) server, from a client application, a request to establish a secure connection from the client application, the request including: (a) a certificate generated using a public-private key pair associated with the client application or a user of the client application and (b) authentication credentials associated with the client application or the user of the client application; determining, at the OIDC server, whether the authentication credentials are valid; establishing, at the OIDC server, that the authentication credentials are valid, and responsively provisioning a cryptographic identifier of the certificate associated with the request to a list of trusted certificates; and providing, at the OIDC server, one or more application servers with access to the list of trusted certificates to enable the one or more application servers to authenticate the client application based on verifying that the cryptographic identifier of the certificate presented by the client application is provisioned into the list of trusted certificates.

Another embodiment provides a method of establishing a future 2-way authentication between a client application and an application server, the method comprising: obtaining, at the client application, a certificate associated with the client application or a user of the client application; transmitting, at the client application, a request to establish a secure connection with an OpenID connect (OIDC) server, the request including the certificate and authentication credentials associated with the client application or the user of the client application; receiving, at the client application, an OIDC token from the OIDC Server, the OIDC token providing an indication that the client application is successfully authenticated by the OIDC server; and transmitting, at the client application, a request to establish a secure connection with an application server, and responsively establishing the secure connection with the application server based on a cryptographic identifier of the certificate being provisioned into a list of trusted certificates by the OIDC server.

Another embodiment provides an application server. The application server includes a communications unit and an electronic processor communicatively coupled to the communications unit. The electronic processor is configured to: receive, via the communications unit, access to a list of trusted certificates from an OIDC server; receive, via the communications unit, a request from a client application to establish a secure connection, the request including a cryptographic identifier of a certificate associated with the client application or a user of the client application; verify that the cryptographic identifier of the certificate is provisioned into the list of trusted certificates; and establish, via the communications unit, a secure connection with the client application after the verification.

Each of the above-mentioned embodiments will be discussed in more detail below, starting with example system and device architectures of the system in which the embodiments may be practiced, followed by an illustration of processing blocks for achieving an improved technical method of establishing a future 2-way authentication between a client application and an application server. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Figure 1:
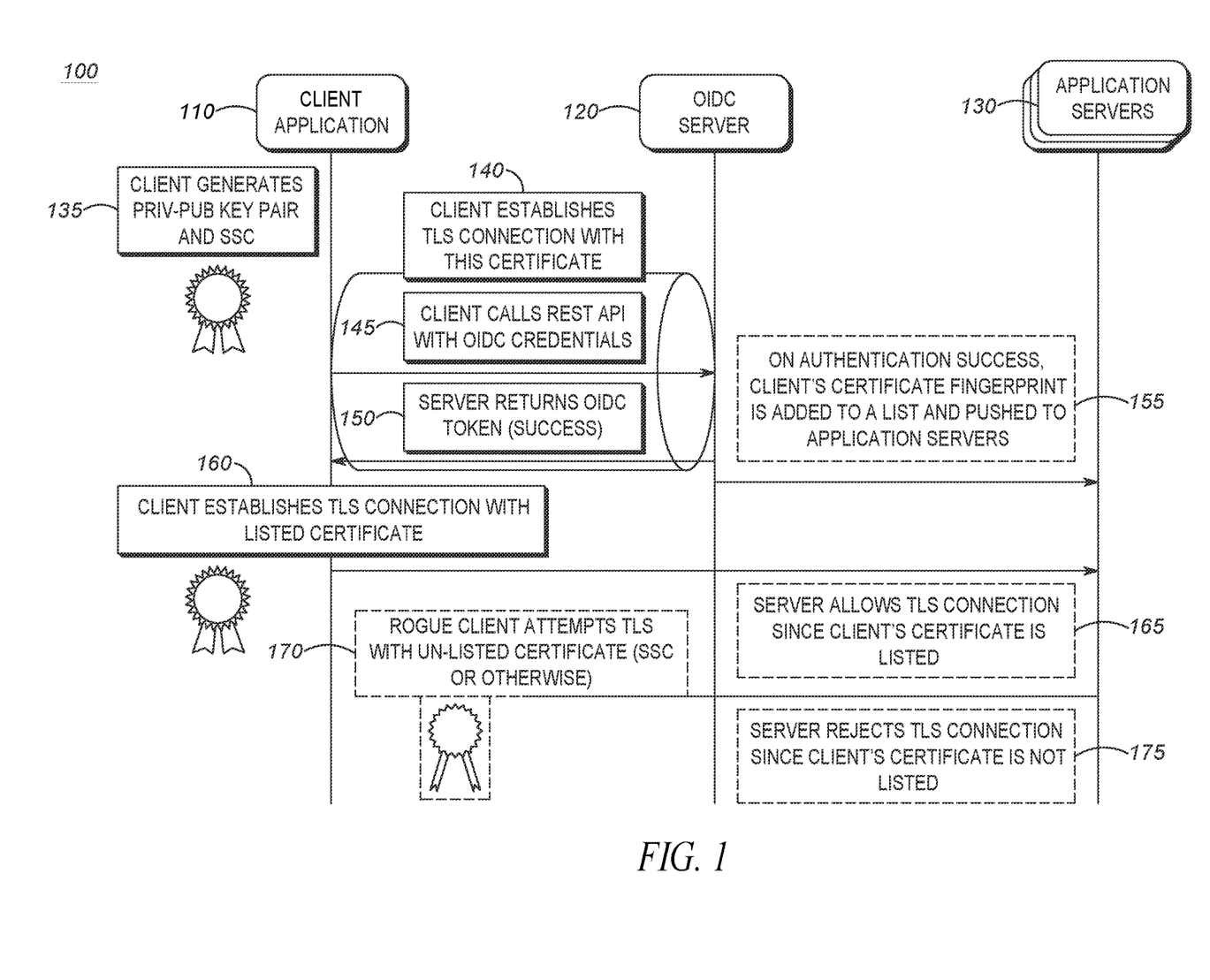
FIG. 1 is a block diagram of a communication system in which the method of establishing a future 2-way authentication between a client application and an application server can be implemented in accordance with some embodiments.

Referring now to the drawings, and in particular FIG. 1, a communication system 100 is shown including a client application 110, an OpenID connect (OIDC) server 120, and one or more application servers 130. In the embodiment shown in FIG. 1, the client application generates a private-public key pair using native key store mechanisms available on a computing device (also referred to as client device) in which the client application is installed/implemented. The computing device in which the client application 110 is installed includes one or more of: electronic device, communication device, portable electronic device, mobile computing device, portable computing device, tablet computing device, smart phone, wearable communication device, mobile camera devices, emergency radio, and the like. In accordance with some embodiments, the client application 110 generates 135 a self-signed certificate (SSC) with this key pair. Alternatively, the client application 110 may use a certificate management function (CMF) provided certificate and associated key pair (generated at client application or CMF). The client application establishes 140 a transport layer security (TLS) connection with the OIDC server 120 using the self-signed certificate generated at the client application or a certificate received from the CMF. In one embodiment, the client application 110 uses existing OIDC credential mechanism to call its Representational State Transfer (REST) Application Programming Interface (API) (with OIDC credentials, for example, username, password, or Multi-factor authentication (MFA) etc.). The client application 110 calls 145 this REST API over a Hypertext Transfer Protocol Secure (HTTPS) connection using the newly generated self-signed certificate or the certificate received from CMF.

If the OIDC authentication succeeds, OIDC Server 120 returns 150 an OIDC token to the client application 110 and further provisions 155 a cryptographic identifier (such as a fingerprint of the certificate or a public key of the certificate) of the certificate associated with the given HTTPS session into a 'list' of trusted client devices/applications (also referred herein as a list of trusted certificates). This information (i.e., list update) is pushed by the OIDC server 120 to all application servers 130. The push may be achieved by multiple methods, for example, using shared distributed databases or REST API calls to individual servers.

Application servers 130 accept TLS connection establishment from clients only if the client's TLS certificate is provisioned into the list of trusted certificates (e.g., session initiation protocol (SIP) signaling TLS connection or Hypertext Transfer Protocol Secure (HTTPS) connection). As shown in FIG. 1, since the client application's 110 cryptographic identifier is provisioned into the list of trusted certificates, the client application 110 would be able to establish 160 TLS connection. In accordance with embodiments, when the application server 130 receives a request from the client application 110 to establish a secure connection, the application server 130 verifies that the cryptographic identifier of the certificate included in the request is provisioned into the list of trusted certificates prior to allowing 165 the TLS connection to be established between the client application 110 and the application server 130. On the other hand, when a second client application, for example, installed in a different client device, attempts 170 to establish TLS connection with a cryptographic identifier of a certificate that is not provisioned into the list of trusted certificates, the application server 130 rejects 175 the TLS connection since the cryptographic identifier for the second client application is not provisioned into the list of trusted certificates. In accordance with embodiments, authorization procedures over the connection (e.g., SIP REGISTER will have a token or REST API will have a token, etc.) can be used. In one embodiment, when the cryptographic identifier of the certificate is a public key of the certificate, the application server 130 challenges a client application 110 to cryptographically prove possession of the corresponding private key as a method of authentication/authorization (where public key of the certificate is provisioned into the list).

In one embodiment, the application servers 130 are provisioned with device identities and each trusted certificate instance in the list is associated with a device identity. The device identity includes, but not limited to, international mobile subscriber identity (IMSI), Mobile Station International Subscriber Directory Number (MSISDN), serial number (e.g. of a device or camera), media access control (MAC) address, International Mobile Equipment Identity (IMEI), etc. In this embodiment, the application servers 130 identify a 'device' or a client application or a user operating the client application or the device using the device identity. For example, when devices are shared between users, the device alone has a trusted certificate. This certificate is used by the client application 110 for any user logged in to the client. This embodiment is also useful for the application servers 130 to remove a trusted certificate from the list of trusted certificates when the device that was being used is de-provisioned, for example, when the device is determined to be lost, stolen, or replaced.

In embodiments where application servers 130 are not provisioned with device identities, there is a need for a mechanism to remove 'stale' trusted entities. In one embodiment, such 'stale' trusted entities are removed based on a configured policy. For example, such 'stale' trusted entities are removed from the list of trusted certificates when the cryptographic certificate is not used to establish connection with application server for a predefined number of days or when there are a predetermined number of OIDC credential failures over a TLS connection with a certificate listed in the list of trusted certificates.

In the embodiments described herein, the "certificate" refers to a certificate fingerprint which may be the entire certificate or the public key. In the embodiments described herein, the cryptographic identifier of the certificate may either refer to a certificate fingerprint or a public key of the certificate.

Figure 2:
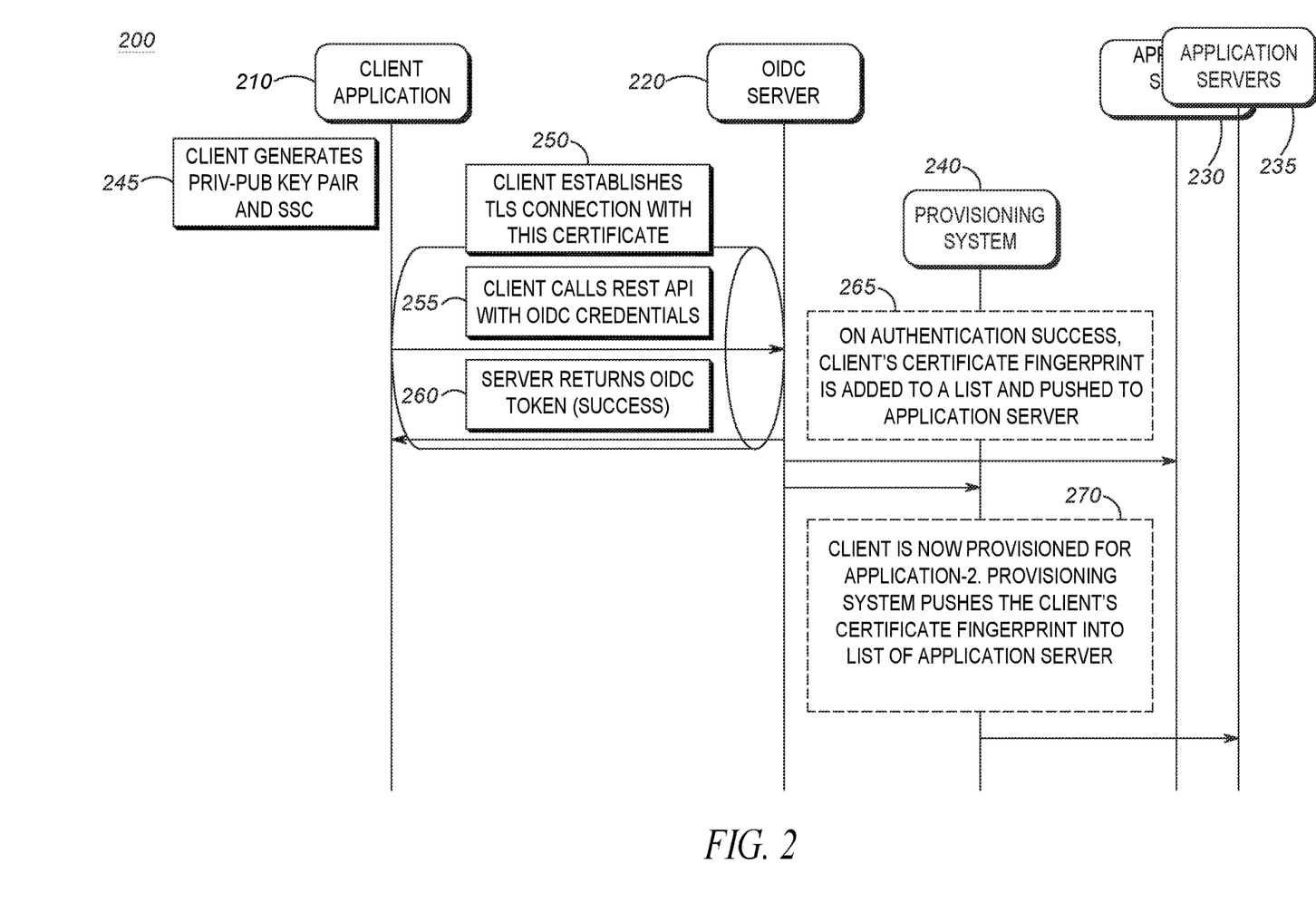
FIG. 2 is a block diagram of a communication system in which the method of establishing a future 2-way authentication between a client application and an application server can be implemented in accordance with some embodiments.

Referring now to FIG. 2, another example of a communication system is shown. A communication system 200 shown in FIG. 2 includes a client application 210, an OpenID connect (OIDC) server 220, and one or more application servers including a first application server 230 and a second application server 235. In the embodiment shown in FIG. 2, the list of trusted certificates is pushed (i.e., made accessible) only to a subset of application servers 230, 235. The subset is selected based on the services enabled for the client as part of client provisioning. For example, a fixed camera's certificate is only pushed to the video server and not to messaging and push-to-talk (PTT) servers. In this embodiment when a user logs in to a shared device, a cryptographic identifier (such as a certificate fingerprint or a public key of the certificate) of the device's certificate is pushed to any additional application servers 230, 235.

In one embodiment, when new services are enabled for a currently provisioned entity, these provisioning operations can trigger adding the entity's trusted certificate to the new application server(s) 230, 235.

As shown in FIG. 2, the client application 210 generates 245 a self-signed certificate (SSC) with this key pair. Alternatively, the client application 210 may use a certificate management function (CMF) provided certificate and associated key pair (generated at client or CMF). The client application establishes 250 a TLS connection with the OIDC server 220 using the self-signed certificate generated at the client application 210 or a certificate received from the CMF. In one embodiment, the client application 210 uses existing OIDC credential mechanism to call its Representational State Transfer (REST) Application Programming Interface (API) (with OIDC credentials, for example, user-name, password, or Multi-factor authentication (MFA) etc.). The client application 210 calls 255 this REST API over a Hypertext Transfer Protocol Secure (HTTPS) connection using the newly generated self-signed certificate or the certificate received from CMF.

If the OIDC authentication succeeds, OIDC Server 220 returns 260 an OIDC token to the client application 110 and further provisions 265 a cryptographic identifier (such as a fingerprint of the certificate or a public key of the certificate) of the certificate associated with the given HTTPS session into a 'list' of trusted certificates. In the embodiment shown in FIG. 2, this information (i.e., list update) is pushed by the OIDC server 220 to a provisioning system 240. The provisioning system 240 then selects a first application server 230 (e.g., video server, messaging server, or a PTT server) based on services currently enabled for the client application 210 and then shares the updated list to the first application server 230. In this case, the client application 210 will be able to establish TLS connection only with the first application server 230 because only the first application server 230 has access to the list and further only the first application server 230 will be able to verify that the cryptographic identifier of the client application's 210 certificate is provisioned into the list.

When a new service is enabled for the client application 210, the OIDC server 220 selects a second application server 235 offering the new service and further provisions 270 (in response to a request received from the client application 210) the cryptographic certificate of the client application's 210 certificate into the list. The provisioning system 240 then shares the list to a second application server 235 to enable the client application 210 to establish secure connection with the second application server 235 after verification. Since the second application server 235 now has access to the list, the second application server 235 will be able to verify that the cryptographic identifier of the client application's 210 certificate is provisioned into the list. In one embodiment, when the cryptographic identifier of the certificate is a public key of the certificate (i.e., not the certificate fingerprint), the second application server 235 challenges the client application 210 to cryptographically prove possession of the corresponding private key as a method of authentication/authorization (where public key of the certificate is provisioned into the list).

In accordance with embodiments, the methods described herein provide a way for application servers to trust an application client that possesses the certificate used for TLS connection with the OIDC server. A different application client running on the same device will have a different certificate and will be enrolled separately when a user logs in from that application client. A third application client running on a different device will have a yet different certificate and will be enrolled separately when a user logs in from that third application client.

Figure 3:
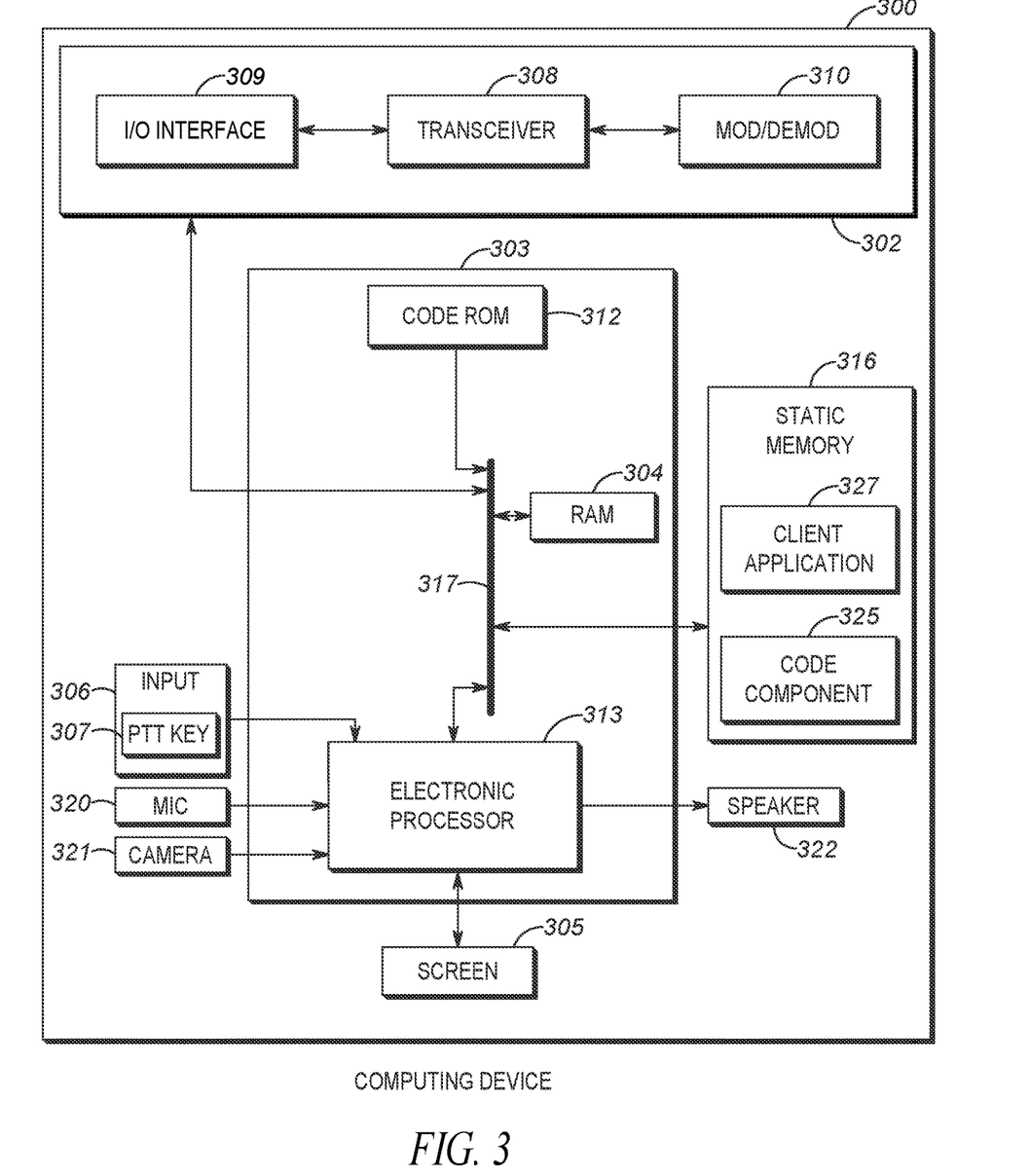
FIG. 3 is a block diagram of a computing device implementing a client application shown in FIGS. 1 and 2.

FIG. 3 is an example functional block diagram of a computing device 300 operating within a communication system shown in FIG. 1 or FIG. 2 in accordance with some embodiments. The client applications 110, 210 shown in FIG. 1 or FIG. 2 can be implemented using the computing device 300 to perform the method of establishing a future 2-way authentication between a client application and an application server. Depending on the type of computing device 300, the computing device 300 may include fewer or additional components in configurations different from that illustrated in FIG. 3.

As shown in FIG. 3, the computing device 300 includes a radio frequency communications unit 302 coupled to a common data and address bus 317 of a processing unit 303. The computing device 300 may also include an input 306 and a display screen 305, each coupled to be in communication with processing unit 303. The input 306 may include an alphanumeric physical keypad (or virtual keypad in cooperation with capacitive touch display screen 305) for inputting text for communications. In accordance with some embodiments, the input 306 may include a suitable interface, for example, a hardware or graphical user interface button or key. In some embodiments, the input 306 may include a push-to-talk (PTT) key 307 that functions to activate a transmit function in a half or full-duplex computing device, transitioning the computing device 300 (when activated) from a listen-only mode to a transmit-only mode (for half-duplex computing devices) or transmit and receive mode (for full-duplex computing devices). A microphone 320 captures speech input from a user that is further vocoded by processing unit 303 and transmitted as voice, text, or multimedia data by communications unit 302 to other computing devices in the communication system. A communications speaker 322 reproduces audio that is decoded from voice data transmissions received from other computing devices via the communications unit 302.

The processing unit 303 also includes an encoder/decoder with an associated code Read Only Memory (ROM) 312 for storing data for initializing system components and encoding and/or decoding voice or other traffic information (including image data, audio data, video data, text data, control signals, etc.) that may be transmitted or received by the computing device 300. The processing unit 303 may further include an electronic processor 313 coupled, by the common data and address bus 317, to the encoder/decoder, a random access memory (RAM) 304, and a static memory 316.

The communications unit 302 is a combined receiver and transmitter (e.g., transceiver) having a common antenna. The communications unit 302 has an I/O interface 309 and further a transceiver 308 that may be coupled to the antenna via a radio frequency amplifier. The transceiver 308 may be a transceiver operating in accordance with one or more standard protocols, such as a digital mobile radio (DMR) transceiver, a Project 25 (P25) transceiver, a terrestrial trunked radio (TETRA) transceiver, a Bluetooth transceiver, a long term evolution (LTE) transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The transceiver 308 is also coupled to a combined modulator/demodulator (MOD/DEMOD) 310 that is coupled to the encoder/decoder.

The electronic processor 313 has ports for coupling to the input 306 and to the display screen 305. The electronic processor 313 further has ports for coupling to a microphone 320, a camera 321, and a speaker 322. The electronic processor 313 may include a microprocessor, a logic circuit, an application-specific integrated circuit (ASIC), a field-programmable gate array (FPGA), or another suitable electronic device. In some embodiments, the static memory 316 may store operating code 325 for the electronic processor 313 that, when executed by the electronic processor 313, perform one or more of the operations set forth in FIGS. 1 and 2 and accompanying text. Static memory 316 may comprise, for example, a hard disk drive (HDD), an optical disk drives (ODD) such as a compact disk (CD) drive or digital versatile disc (DVD) drive, a solid-state drive (SSD), a tape drive, a flash memory drive, or a tape drive, to name a few. The static memory 316 stores one or more client applications 327. In accordance with some embodiments, the static memory 316 also stores mechanisms for generating a self-signed certificate using a public-private pair.

In accordance with some embodiments, the OIDC server 120, 220 may similarly (as shown in FIG. 3) include a communications unit, processing unit, and a memory for performing the method of establishing a future 2-way authentication between a client application and an application server. In one embodiment, the OIDC server 120, 220 locally maintains and/or accesses a cloud memory to create and/or update a list of trusted certificates/keys. The OIDC server 120, 220 also selectively provides access of the list of trusted certificates/keys to application servers 130, 230, 235 in accordance with the embodiments described herein. The application servers 130, 230, 235, may similarly include a communications unit, processing unit, and a memory for verifying whether a cryptographic identifier of certificate is provisioned into the list of trusted certificates and further establish, via the communications unit, a secure connection with the client application 110, 210 after the verification.

Figure 4:
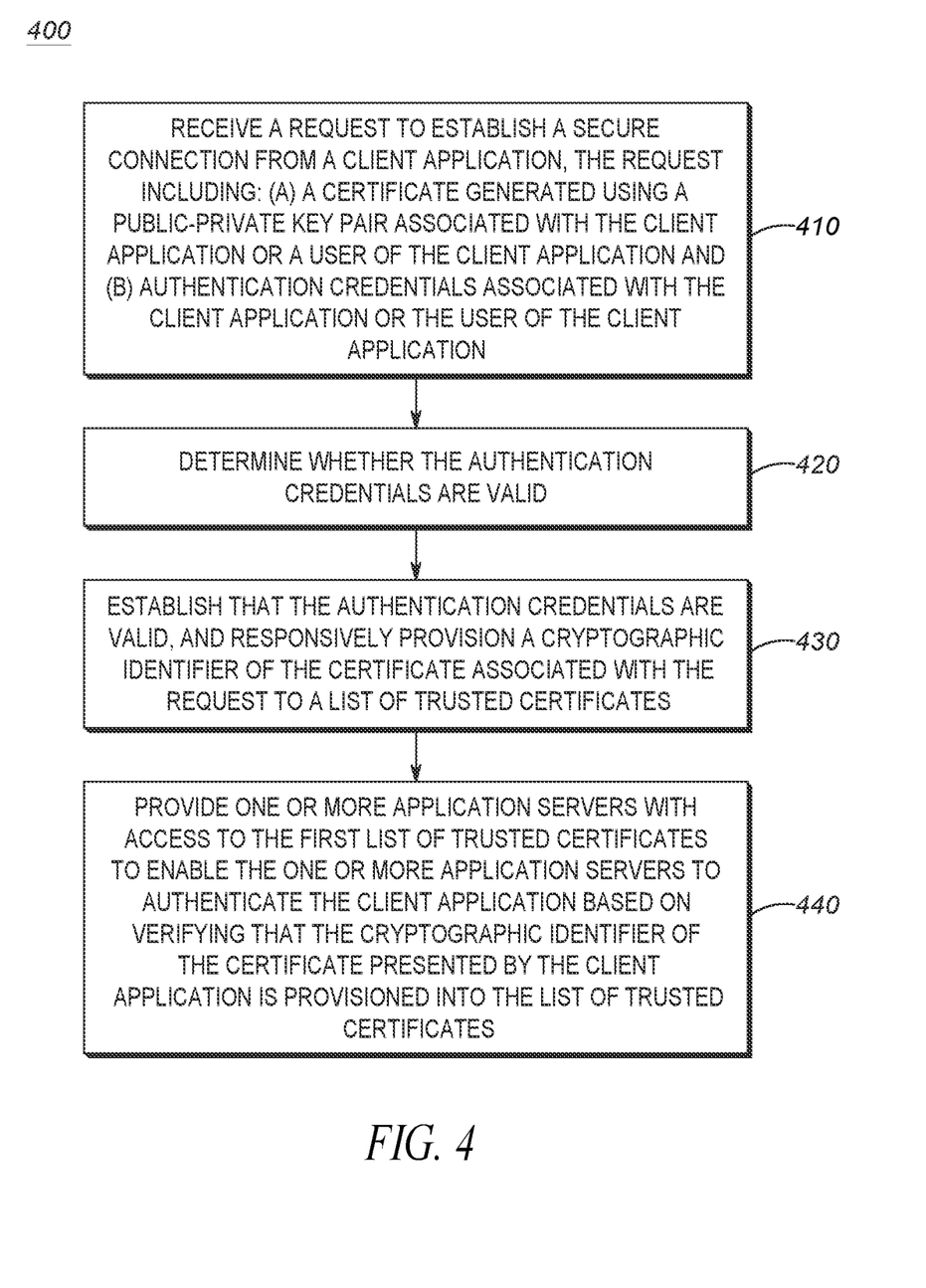
FIG. 4 is a flowchart diagram illustrating a method performed at an OIDC server for establishing a future 2-way authentication between a client application and an application server can be implemented in accordance with some embodiments.

Turning now to FIG. 4, a flowchart diagram illustrates a method 400 of establishing a future 2-way authentication between a client application (e.g., client application 110 or 210) and an application server (e.g., application server 130, 230, 235). While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. An OIDC server 120, 220 shown in FIG. 1 and/or FIG. 2, and embodied as a singular computing device or distributed computing device (as shown in FIG. 3) may execute method 400 via an electronic processor 313 implemented at the computing device 300.

At block 410, an OpenID connect (OIDC) server receives, from a client application, a request to establish a secure connection from the client application. The request includes: (i) a certificate generated using a public-private key pair associated with the client application or a user of the client application and (ii) authentication credentials (OIDC credentials such as a username, a password, or a Multi-factor authentication (MFA)) associated with the client application or the user of the client application. In accordance with some embodiments, the certificate is a self-signed certificate generated by the client application. In one embodiment, the certificate includes a certificate generated by a certificate management function (CMF) or a self-signed certificate (SSC) generated by the client application.

At block 420, the OIDC server determines whether the authentication credentials associated with the client application or a user of the client application are valid.

At block 430, when the OIDC server establishes that the authentication credentials are valid, the OIDC server responsively provisions a cryptographic identifier of the certificate associated with the request to a list of trusted certificates. The cryptographic identifier of the certificate is one of a certificate fingerprint of the client application's certificate or the public key of the certificate.

On the other hand, when the OIDC server establishes that the authentication credentials are not valid, then the OIDC server may refrain from provisioning the cryptographic identifier of the client application's certificate to the list of trusted certificates. Alternatively, in one embodiment, the OIDC server provisions the cryptographic identifier of the certificate associated with the request to a list of un-trusted certificates when it is established that the authentication credentials are not valid.

At block 440, after establishing that the authentication credentials are valid, the OIDC server provides one or more application servers with access to the list of trusted certificates to enable the one or more application servers to authenticate the client application based on verifying that the cryptographic identifier of the certificate presented by the client application is provisioned into the list of trusted certificates. When the cryptographic identifier provisioned into the list is a certificate fingerprint of the client application's certificate, the OIDC server enables the one or more application servers to authenticate the client application based on verifying that the certificate fingerprint of the certificate presented by the client application is provisioned into the list. On the other hand, when the cryptographic identifier of the certificate is the public key of the certificate, the OIDC servers enables the one or more application servers to authenticate the client application based on cryptographically verifying the possession of the private key corresponding to the public key used to sign the client application's certificate (i.e., certificate associated with the request received at the OIDC server).

In one embodiment, the OIDC server further links a device identifier to the cryptographic identifier of the certificate associated with the request when the cryptographic identifier of the certificate is provisioned into the list of trusted certificates to enable the one or more application servers to authenticate the client application based on (i) verifying that the cryptographic identifier of the certificate presented by the client application is provisioned into the list of trusted certificates and (ii) verifying that the client application presenting the certificate is associated with a device identifier to which the cryptographic identifier of the certificate is linked.

In one embodiment, the OIDC server de-provisions the certificate from the list of trusted certificates in response to receiving a signal indicating that a client device associated with the device identifier is lost, stolen, or replaced. In another embodiment, the OIDC server de-provisions the certificate from the list of trusted certificates when the certificate was unused by the client application for a predefined period of time since the certificate was provisioned into the list of trusted certificates, or when the authentication credentials presented by the client application to establish a connection with the one or more applications servers are determined to be invalid for a predefined number of times.

In one embodiment, the OIDC server selects the one or more application servers (e.g., a video server, a messaging server, or a PTT server) based on services currently enabled for the client application. In this embodiment (as further shown in FIG. 2) when the OIDC server determines that a new service is enabled for the client application, the OIDC server responsively selects at least one other application server offering the new service. The OIDC server then provides the at least one other application server with access to the list of trusted certificates to enable the at least one other application server to authenticate the client application based on verifying that the certificate presented by the client application is provisioned into the list of trusted certificates.

Figure 5:
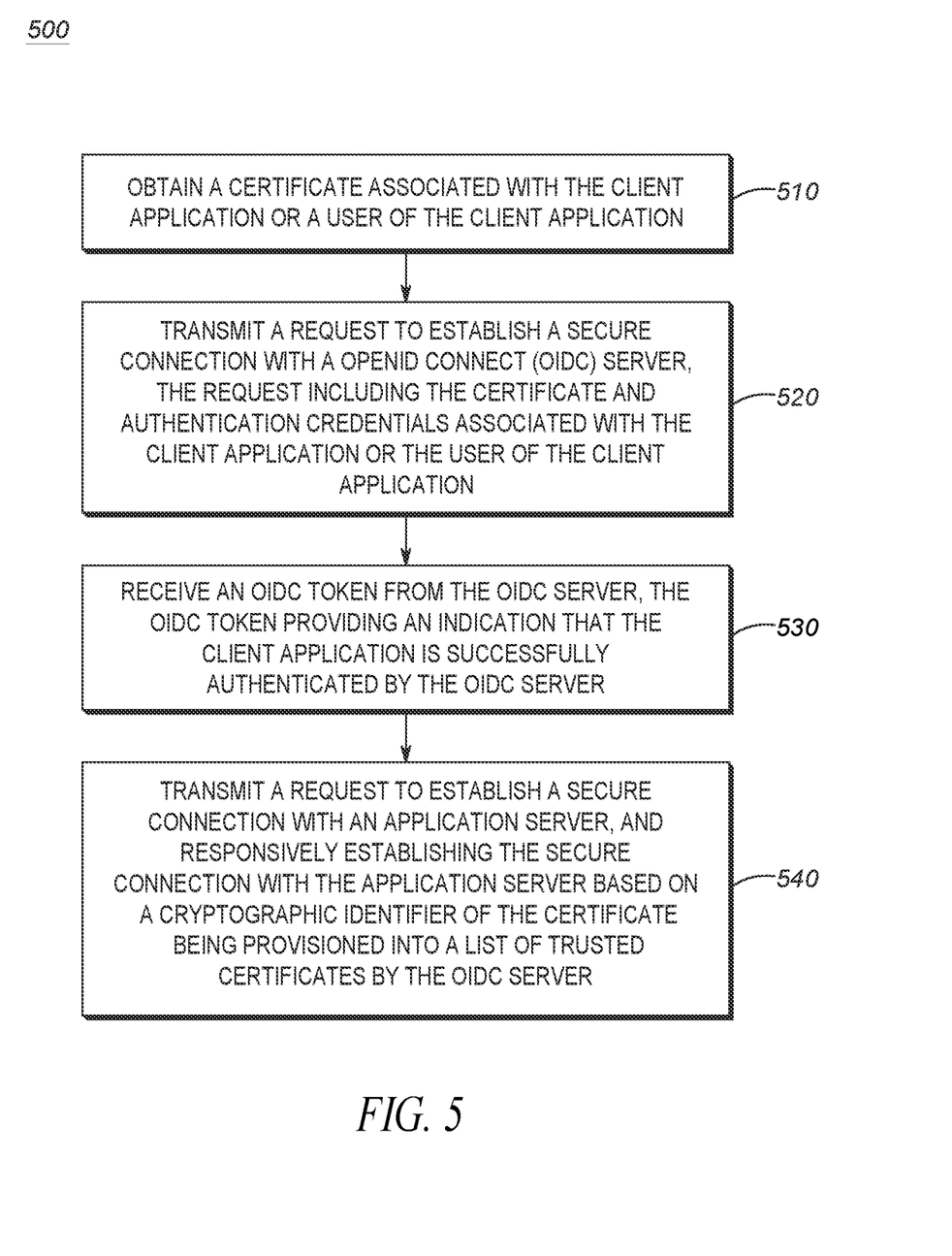
FIG. 5 is a flowchart diagram illustrating a method performed at a client application for establishing a future 2-way authentication between the client application and an application server can be implemented in accordance with some embodiments.

Turning now to FIG. 5, a flowchart diagram illustrates a method 500 of establishing a future 2-way authentication between a client application (e.g., client application 110 or 210) and an application server (e.g., application server 130, 230, or 235). While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. A client application 110, 210 shown in FIG. 1 and/or FIG. 2, and installed on a client or a computing device (as shown in FIG. 3) may execute method 500 via an electronic processor 313 implemented at the computing device 300.

At block 510, the client application obtains a certificate associated with the client application or a user of the client application. In accordance with some embodiments, the client application generates a public-private key pair and self-signs a certificate using the public-private key pair. Alternatively, the certificate is obtained from a certificate management function (CMF).

At block 520, the client application transmits a request to establish a secure connection with an OpenID connect (OIDC) server. The request includes the certificate and authentication credentials (e.g., username, password, MFA etc.) associated with the client application or the user of the client application.

At block 530, the client application receives an OIDC token from the OIDC Server. The OIDC token provides an indication that the client application is successfully authenticated by the OIDC server.

At block 540, the client application transmits a request to establish a secure connection with an application server, and responsively the client application establishes a secure connection with the application server based on a cryptographic identifier of the client application's certificate being provisioned into a list of trusted certificates by the OIDC server. The cryptographic identifier of the certificate is one of a certificate fingerprint or the public key used to sign the certificate. When the cryptographic identifier of the certificate is the certificate fingerprint, the client application establishes a secure connection with the application server by presenting the certificate in the request transmitted to the application server. The client application in response receives successful authorization from the application server based on the application server verifying that a certificate fingerprint of the certificate included in the request is provisioned into the list of trusted certificates by the OIDC server. On the other hand, when the cryptographic identifier of the certificate is the public key of the certificate, the client application establishes a secure connection with the application server by receiving a challenge from the application server in response to the request transmitted to the application server. The client application then transmits a response to the application server. The response is generated (e.g., encrypted or signed) using a private key corresponding to the public key that was used to sign the certificate associated with the request sent to the OIDC server. The client application in response receives successful authorization from the application server based on the application server cryptographically verifying possession of the private key corresponding to the public key that was used to sign the certificate associated with the request transmitted to the OIDC server.

In one embodiment, the request transmitted at block 520 further includes information identifying one or more services requested by the client application. In this embodiment, the certificate included in the request to the OIDC server includes a first service identifier associated with the OIDC server and the cryptographic identifier of certificate presented by the client application (at block 540) to the application server includes a second service identifier associated with the application server.

In one embodiment, when a new service is enabled for the client application, the client application transmits a second request to establish a secure connection with a second application server by presenting the cryptographic identifier of the same certificate associated with the client application or the user of the client application. The client application then establishes a secure connection with the second application server based on the cryptographic identifier of the client application's certificate being provisioned into the list of trusted certificates by the OIDC server. In this case, wherein the cryptographic identifier of the certificate presented by the client application to the second application server includes a third service identifier associated with the second application server.

Figure 6:
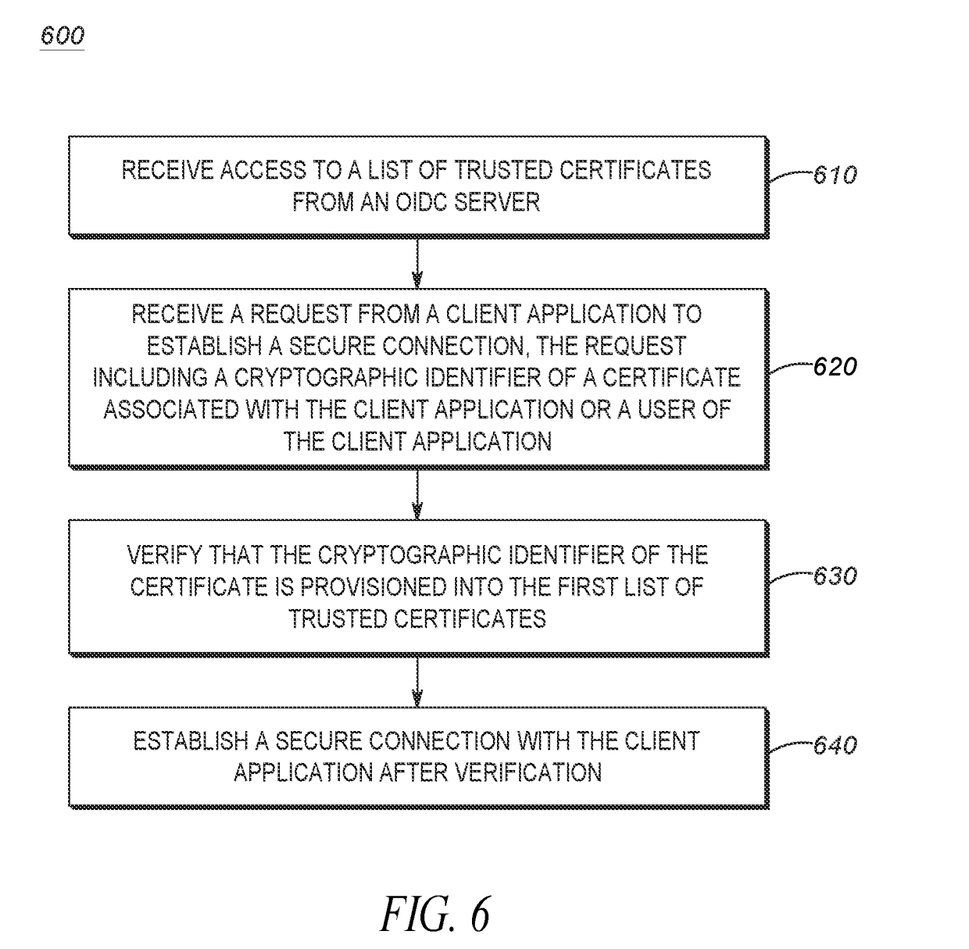
FIG. 6 is a flowchart diagram illustrating a method performed at an application server for establishing a future 2-way authentication between a client application and the application server can be implemented in accordance with some embodiments.

Turning now to FIG. 6, a flowchart diagram illustrates a method 600 of establishing a future 2-way authentication between a client application (e.g., client application 110 or 210) and an application server (e.g., application server 130, 230, or 235). While a particular order of processing steps, message receptions, and/or message transmissions is indicated in FIG. 4 as an example, timing and ordering of such steps, receptions, and transmissions may vary where appropriate without negating the purpose and advantages of the examples set forth in detail throughout the remainder of this disclosure. An application server 130, 230, or 235 shown in FIG. 1 and/or FIG. 2, and implemented on a computing device (as shown in FIG. 3) may execute method 600 via an electronic processor 313 implemented at the computing device 300.

At block 610, the application server receives access to a list of trusted certificates from an OIDC server.

At block 620, the application server receives a request from a client application to establish a secure connection. The request includes a cryptographic identifier (e.g., certificate itself or alternatively only a public key used to sign the certificate) of a certificate associated with the client application or a user of the client application.

At block 630, the application server verifies that the cryptographic identifier of the certificate is provisioned into the list of trusted certificates. In one embodiment, when the cryptographic identifier of the certificate is a certificate fingerprint of the certificate, the application server verifies that a fingerprint of the certificate included in the request is provisioned into the list of trusted certificates. If the certificate fingerprint of the client application's certificate is not provisioned into the list of trusted certificates, then the application server rejects the request from the client application to establish a secure connection. Otherwise, at block 640, the application server establishes a secure connection with the client application after verification i.e., after verifying that the certificate fingerprint of the client application's certificate is provisioned into the list of trusted certificates.

In another embodiment, when the cryptographic identifier of the certificate is a public key that was used to sign the client application's certificate, the application server transmits a challenge to the client application in response to receiving the request at block 620 from the client application. The application server then receives from the client application a response generated (e.g., encrypted or signed) using a private key corresponding to a public key that was used to sign the certificate of the client application. The application server establishes a secure connection with the client application only after cryptographically verifying client application's possession of the private key corresponding to the public key used to sign the certificate based on the received response. On the other hand, when the application server cannot cryptographically verify that client application is in possession of a private key i.e., a private key corresponding to a public key that was used to sign the client application's certificate, then the application server rejects the request from the client application to establish a secure connection.

Systems that implement the embodiments described herein ensure downstream application servers are protected from rogue traffic. For example, in a mission-critical push-to-talk (MCPTT)/Video/Push-to-X (PTX) deployment, any rogue client (i.e., any client which does not possess a certificate that is already provisioned into a list of trusted certificates) trying to create a TLS connection with an application server (on that server's IP/Port—PTT/PTX/Video etc.) will be denied entry right at the TLS setup itself. Only valid clients' traffic is forwarded by the TLS ingress point to application servers. This is a significant benefit from a cost, deployment, or on-boarding simplicity perspective. Embodiments described herein also apply to the token federation and single sign on use cases with external OIDC servers. Embodiments described herein also provide a way for mitigating brute force attacks from rogue devices since with the methods described herein, the only check required at TLS ingress is: client's certificate provided by client in TLS session setup must be in the list of trusted certificates (e.g., based on SHA256 hash comparison of the certificate presented by the client or comparison of public key or comparison of certificate itself). In contrast, traditional TLS establishment checks such as evaluation of each certificate in the chain for depth, validity, signing authority, etc., are more computationally expensive.

As should be apparent from this detailed description, the operations and functions of the computing device are sufficiently complex as to require their implementation on a computer system, and cannot be performed, as a practical matter, in the human mind. Computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot determine accurate location of the computing device, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of establishing a future 2-way authentication between a client application and an application server, the method comprising:

receiving, at an OpenID connect (OIDC) server, from a client application, a request to establish a secure connection from the client application, the request including: (a) a certificate generated using a public-private key pair associated with the client application or a user of the client application and (b) authentication credentials associated with the client application or the user of the client application;

determining, at the OIDC server, whether the authentication credentials are valid;

establishing, at the OIDC server, that the authentication credentials are valid, and responsively provisioning a cryptographic identifier of the certificate associated with the request to a list of trusted certificates;

providing, at the OIDC server, one or more application servers with access to the list of trusted certificates to enable the one or more application servers to establish a secure connection with the client application based on verifying that the cryptographic identifier of the certificate presented by the client application is provisioned into the list of trusted certificates; and linking a device identifier to the cryptographic identifier of the certificate associated with the request when the cryptographic identifier of the certificate is provisioned to the list of trusted certificates to enable the one or more application servers to establish the secure connection with the client application based on (a) verifying that the cryptographic identifier of the certificate presented by the client application is provisioned into the list of trusted certificates and (b) verifying that the client application presenting the cryptographic identifier of the certificate is associated with the device identifier to which the cryptographic identifier of the certificate is linked.

2. The method of claim 1, wherein the certificate includes (a) a certificate generated by a certificate management function, or (b) a self-signed certificate generated by the client application.

3. The method of claim 1, wherein the cryptographic identifier of the certificate is the public key of the certificate.

4. The method of claim 3, wherein when the cryptographic identifier of the certificate is the certificate fingerprint, the method further comprising:

establishing the secure connection with the client application at the one or more application servers based on verifying that the certificate fingerprint of the certificate presented by the client application is provisioned into the list of trusted certificates.

5. The method of claim 3, wherein when the cryptographic identifier of the certificate is the public key of the certificate, the method further comprising:

establishing the secure connection with the client application at the one or more application servers based on cryptographically verifying possession of the private key corresponding to the public key used to sign the certificate associated with the request received at the OIDC server.

6. The method of claim 1, further comprising:

provisioning the cryptographic identifier of the certificate associated with the request to a list of un-trusted certificates when it is established that the authentication credentials are not valid.

7. The method of claim 1, further comprising: de-provisioning the cryptographic identifier of the certificate from the list of trusted certificates in response to receiving a signal indicating that a client device associated with the device identifier is lost, stolen, or replaced.

8. The method of claim 1, further comprising:

de-provisioning the cryptographic identifier of the certificate from the list of trusted certificates when the certificate was unused by the client application for a predefined period of time since the cryptographic identifier of the certificate was provisioned into the list of trusted certificates, or when the authentication credentials presented by the client application to establish a connection with the one or more applications servers are invalid.

9. The method of claim 1, further comprising: determining that a new service is enabled for the client application, and responsively selecting at least one other application server offering the new service; and providing the at least one other application server with access to the list of trusted certificates to enable the at least one other application server to establish a secure connection with the client application based on verifying that the cryptographic identifier of the certificate presented by the client application is provisioned into the list of trusted certificates.

10. The method of claim 1, further comprising providing, at the OIDC server, the one or more application servers with access to the list of trusted certificates to enable the one or more application servers to reject a request from the client application to establish a secure connection based on verifying that the cryptographic identifier of the certificate presented by the client application is not provisioned into the list of trusted certificates.

11. A method of establishing a future 2-way authentication between a client application and an application server, the method comprising:

obtaining, at the client application, a certificate associated with the client application or a user of the client application, wherein the client application generates a public-private key pair and self-signs the certificate using the public-private key pair or the certificate is obtained from a certificate management function (CMF);

transmitting, at the client application, a request to establish a secure connection with an OpenID connect (OIDC) server, the request including the certificate and authentication credentials associated with the client application or the user of the client application;

receiving, at the client application, an OIDC token from the OIDC Server, the OIDC token providing an indication that the client application is successfully authenticated by the OIDC server;

transmitting, at the client application, a request to establish a secure connection with an application server, and responsively establishing the secure connection with the application server based on the application server obtaining access to a list of trusted certificates from the OIDC server and further verifying that a cryptographic identifier of the certificate being is provisioned into the list of trusted certificates by the OIDC server; and linking a device identifier to the cryptographic identifier of the certificate associated with the request when the cryptographic identifier of the certificate is provisioned to the list of trusted certificates to enable the one or more application servers to establish the secure connection with the client application based on (a) verifying that the cryptographic identifier of the certificate presented by the client application is provisioned into the list of trusted certificates and (b) verifying that the client application presenting the cryptographic identifier of the certificate is associated with the device identifier to which the cryptographic identifier of the certificate is linked.

12. The method of claim 11, wherein when the cryptographic identifier of the certificate is a certificate fingerprint, wherein establishing the secure connection with the application server further comprises:

presenting the certificate in the request transmitted to the application server; and responsively receiving successful authorization from the application server based on the application server verifying that a certificate fingerprint of the certificate presented in the request is provisioned into the list of trusted certificates by the OIDC server.

13. The method of claim 11, wherein when the cryptographic identifier of the certificate is the public key of the certificate, wherein establishing the secure connection with the application server further comprises:

receiving, at the client application, a challenge from the application server;

transmitting, at the client application, to the application server, a response generated using a private key corresponding to the public key that was used to sign the certificate associated with the request sent to the OIDC server; and responsively receiving successful authorization from the application server based on the application server cryptographically verifying possession of the private key corresponding to the public key that was used to sign the certificate associated with the request transmitted to the OIDC server.

14. The method of claim 11, wherein obtaining the certificate comprises:

generating, at the client application, a public-private key pair, wherein the obtained certificate corresponds to a certificate that is self-signed using the public-private key pair.

15. The method of claim 11, wherein the certificate included in the request to the OIDC server includes a first service identifier associated with the OIDC server and the cryptographic identifier of the certificate presented by the client application to the application server includes a second service identifier associated with the application server.

16. The method of claim 11, further comprising:

transmitting, at the client application, a second request to establish a secure connection with a second application server by presenting the cryptographic identifier of the certificate associated with the client application or the user of the client application, and responsively establishing a secure connection with the second application server based on the cryptographic identifier of the certificate being provisioned into the list of trusted certificates by the OIDC server, wherein the cryptographic identifier of the certificate presented by the client application to the second application server includes a third service identifier associated with the second application server.

17. An application server, comprising: a communications unit; and an electronic processor communicatively coupled to the communications unit, the electronic processor configured to:

receive, via the communications unit, access to a list of trusted certificates from an OIDC server, the list of trusted certificates provisioned with a cryptographic identifier of a certificate associated with a client application as a result of validating authentication credentials presented by the client application to the OIDC server;

receive, via the communications unit, a request from the client application to establish a secure connection, the request including the cryptographic identifier of the certificate associated with the client application or a user of the client application, wherein the cryptographic identifier is a public key of the certificate;

verify that the cryptographic identifier of the certificate is provisioned into the list of trusted certificates;

establish, via the communications unit, a secure connection with the client application after the verification; and linking a device identifier to the cryptographic identifier of the certificate associated with the request when the cryptographic identifier of the certificate is provisioned to the list of trusted certificates to enable the one or more application servers to establish the secure connection with the client application based on (a) verifying that the cryptographic identifier of the certificate presented by the client application is provisioned into the list of trusted certificates and (b) verifying that the client application presenting the cryptographic identifier of the certificate is associated with the device identifier to which the cryptographic identifier of the certificate is linked.

18. The application server of claim 17, wherein the electronic processor is further configured to:

transmit, via the communications unit, a challenge to the client application in response to receiving the request from the client application;

receive, via the communications unit, a response generated using a private key corresponding to the public key that was used to sign the certificate of the client application; and establishing, via the communications unit, the secure connection with the client application after cryptographically verifying, from the received response, client application's possession of the private key corresponding to the public key used to sign the certificate.

19. The application server of claim 17, wherein the electronic process is configured to:

receive, via the communications unit, a request from a second client application to establish a secure connection, the request including a second cryptographic identifier of a second certificate associated with the second client application or a user of the second client application, wherein the second cryptographic identifier is a second public key of the second certificate;

verify that the second cryptographic identifier of the second certificate is not provisioned into the list of trusted certificates; and reject the request from the second client application to establish a secure connection application after the verification.

* * * * *